March 19, 1963 J. J. TOMSELLO 3,081,572
WEEDLESS FISH LURE
Filed March 30, 1961 2 Sheets-Sheet 1
FIG. 1
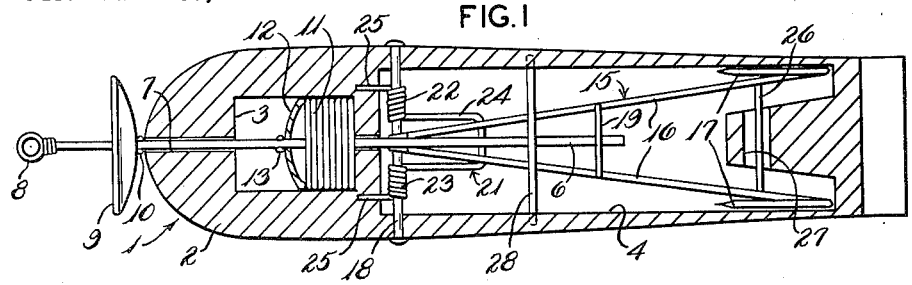
FIG. 2
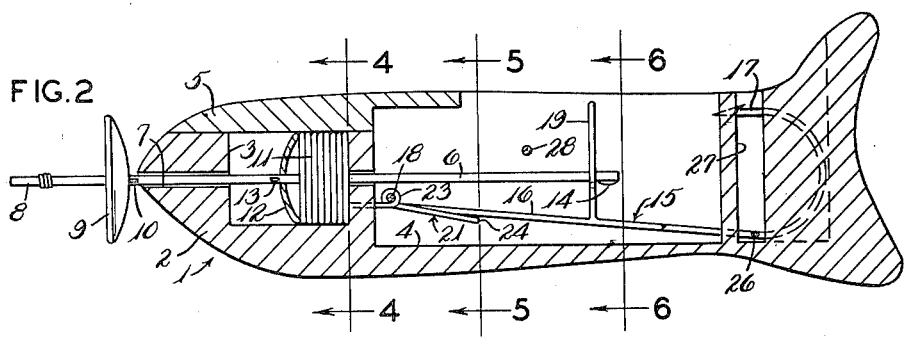
FIG. 3
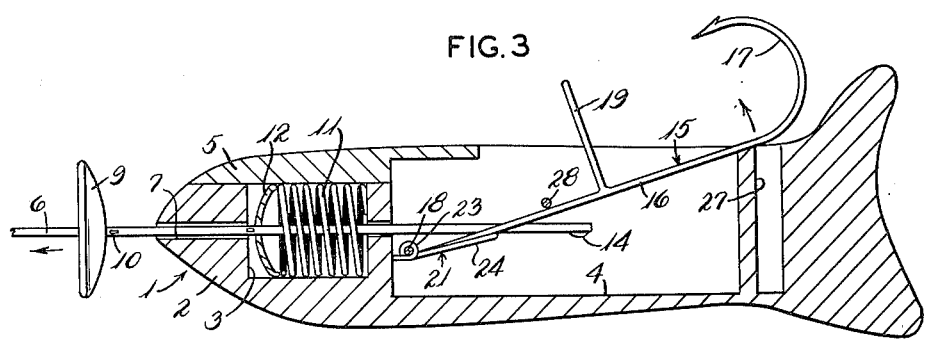
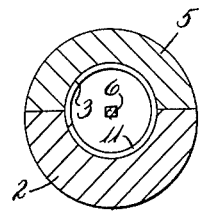
FIG. 4
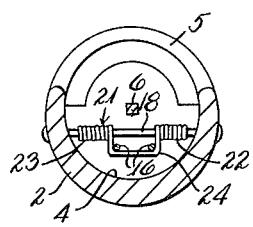
FIG. 5
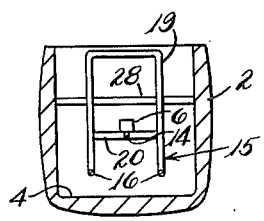
FIG. 6
*INVENTOR.*
JOSEPH J. TOMSELLO
BY
*Oldham & Oldham*
ATTYS.

March 19, 1963 J. J. TOMSELLO 3,081,572
WEEDLESS FISH LURE
Filed March 30, 1961 2 Sheets-Sheet 2

*INVENTOR.*
JOSEPH J. TOMSELLO
BY Oldham & Oldham
ATTYS.

ยงunited States Patent Office 3,081,572
Patented Mar. 19, 1963

3,081,572
WEEDLESS FISH LURE
Joseph J. Tomsello, 4612 Northampton Road,
Cuyahoga Falls, Ohio
Filed Mar. 30, 1961, Ser. No. 99,509
10 Claims. (Cl. 43—35)

The present invention relates to fish lures, especially to a novel and improved type of a weedless fish lure having good fish catching characteristics.

Heretofore there have been various types of fish lures provided and some of them have endeavored to provide a weedless fishing action by positioning the hooks in a retracted position but with the hooks being extended for operative use when a fish bites or strikes the lure in some predetermined manner. Insofar as I am aware, none of such prior art structures have been completely satisfactory in that they have involved relatively complicated mechanisms for controlling the hooking action, or else the lures have been relatively expensive, or have not given an effective fish catching action.

The general object of the present invention is to provide a novel and improved weedless fish lure characterized by the relatively inexpensive construction thereof and by the positive release action for the springs when a fish contacts the lure.

A further object of the invention is to provide a fish lure of the type described and wherein a pair of hooks are pivotally positioned within the lure for normal pulling of the lure through the water, but with a readily releasable catch and a strong spring means being associated with the hooks to permit them to spring rapidly outwardly of the fish lure when a fish strikes the lure or attempts to hold it from continued movement through a body of water.

Another object of the invention is to use a "mouse trap" type of a spring latch construction in a fish lure for retaining hook means therein in an inoperative, latched position while the lure is being pulled through the water for normal fishing action, and with such latched position of the hook means being readily releasable by an external force applied to the lure as it is moved through the water.

Another object of the invention is to provide a fish lure body with a relatively long recess therein for receiving hook means in inoperative position and with a special cross bar or latch member being associated with the hooks and being positioned adjacent the center portion of the lure body when the hooks are inoperatively positioned for a hook latching action to retain the hooks in a retracted, inoperative position.

Another object of the invention is to provide a new type of a weedless lure which can be made of any desired shape and can be made from any conventional material.

The foregoing and other objects and advantages of the invention will be made more apparent as the specification proceeds.

In order to understand the invention more completely, reference is directed to the accompanying drawings, wherein:

FIG. 1 is a longitudinal horizontal section taken through a fish lure embodying the principles of the invention and showing the lure in its preferred form;

FIG. 2 is a vertical section through the fish lure of FIG. 1;

FIG. 3 is a vertical section, like FIG. 2, but with the hooks shown in their extended or operative positions;

Figure 7:
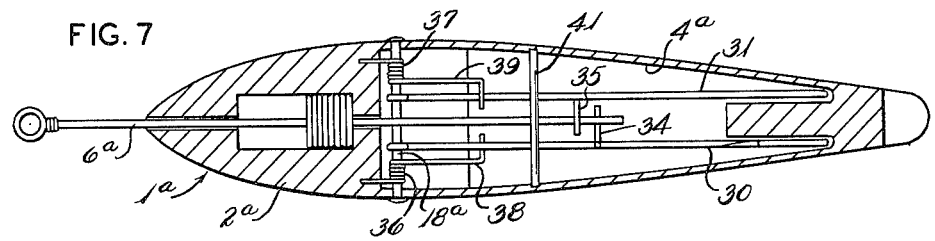
Figure 8:
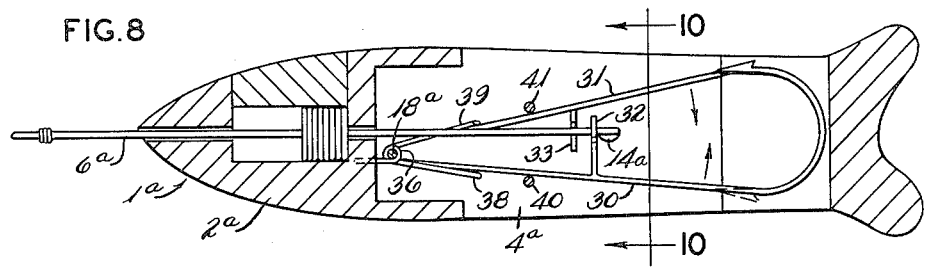
Figure 9:
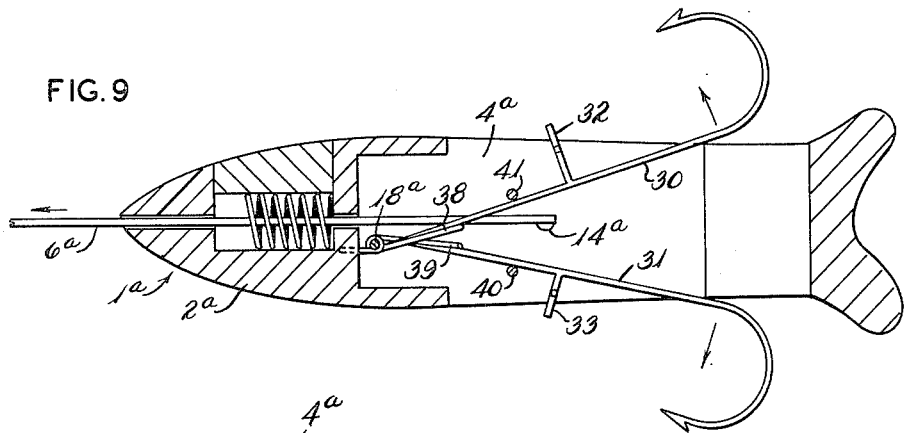
Figure 10:
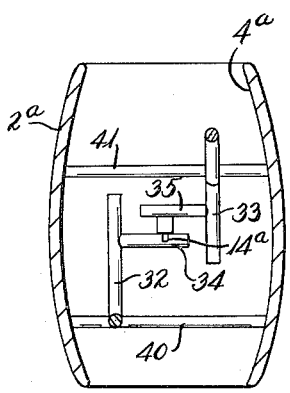

FIGS. 4, 5 and 6 are vertical sections taken on lines 4—4, 5—5 and 6—6, respectively, of FIG. 2;

FIG. 7 is a longitudinal horizontal section through a modified embodiment of the invention;

FIG. 8 is a vertical section through the fish lure of FIG. 7 with the hooks being shown in inoperative position;

FIG. 9 is a vertical section, like FIG. 8, but with the hooks in their released or operative position; and FIG. 10 is an enlarged vertical section taken on line 10—10 of FIG. 8.

When referring to corresponding members shown in the drawings and referred to in the specification, corresponding numerals are used to facilitate comparison therebetween.

The present invention, generally speaking, relates to a weedless type of a fish lure that comprises a lure body simulating some type of a fish bait and having a front compartment and an elongate recess in the lure body which recess is open to a margin of such lure body, a control pin, or member extending from the front of the lure body to be secured to a fish line and slidably engaging the lure body and extending through the front compartment and into the elongate recess of the body, a generally axially extending hook means having a front shank portion and a hook portion received within the elongate recess and normally positioned within the periphery of the lure body, means securing the shank end of the hook means pivotally to the lure body adjacent the front end of such shank portion, a spring member positioned in the front compartment to engage the control pin and urge it forwardly of the lure body, other spring means positioned in the elongate recess and engaging the hook means for resiliently urging the hook portion thereof outwardly of the lure body at all times, and a latch means or unit operatively engaging the hook means and control pin to prevent the spring means from moving the hook means out of the elongate recess until the control pin is pulled forwardly to effect release of the latch means, which release action is obtained by a restraining force being applied to the lure body as the fish lure is being pulled through the water.

Attention now is particularly directed to the details of the structure shown in the drawings, and a fish lure of the invention is indicated as a whole by the numeral 1. In this embodiment of the invention, the fish lure includes a lure body 2 formed in the general shape of a minnow and including a body and tail section and with a front recess 3 being provided in the lure body. An elongate recess 4 also is formed in the center and tail portion of the lure body and such recess is open to a margin of the lure body. Preferably some type of a cover 5 is suitably secured over the front recess 3 so as to form a front compartment in the lure body after the components of the fish lure have been assembled therein. It will be realized that the lure body 2 can be made from any suitable material, such as wood, plastic, or other known materials, and the cover 5 can be secured to the remainder of the lure body by adhesive cements, screws, or the like, as desired.

The fish lure 1 includes a control pin, rod or member 6 that extends axially of the lure body and is slidably engaged therewith. Such control pin, as shown in FIGS. 4 and 5 is of square shape in section and is received in a complementary shaped bore 7 provided in the lure body. Thus the control pin 6 is slidably engaged with the lure body but preferably is received for only axial movement therein so that any rotation of the control pin with relation to the lure body is prevented. The drawings clearly illustrate that the control pin 6 extends through the front recess or compartment 3 in the lure body and extends an appreciable distance into the elongate recess 4. The control pin 6 is used for pulling the fish lure through a body of water and thus preferably has a front eye 8 formed thereon for engaging a suitable fish leader, or other conventional member. A disc 9, which may be of concave shape is slidably engaged with the control pin 6 in this embodiment of the invention and is provided to aid in creating a little disturbance as the fish lure is drawn through a body of water to aid in attracting attention thereto. Such disc itself, or one or more stop flanges or means 10 formed on, and usually are integral with, the control pin 6 are provided to extend therefrom and limit axial movement of the control pin in the bore 7 in the lure body 2. The control pin also has a coil spring 11 associated therewith. Such coil spring 11, or similar spring member, is positioned within the front recess 3 and engages the control pin 6, as by means of a disc, or washer 12 carried by the control pin 6 and limited in its movement with relation to the control pin 6 as by means of a stop flange, lip or similar device 13 formed on or secured to the control pin 6.

As an important feature of the invention, FIGS. 2 and 3 of the drawings best show that a downwardly extending latching lip, tip, or means 14 is preferably formed integrally with the control pin 6 and extends therefrom a short distance towards the base of the recess 4 at the inner end of the control pin 6. The drawings show that this latch lip 14 may be of smooth arcuate peripheral contour in the portion thereof extending downwardly of the control pin for convenient latching and release action, as hereinafter described.

Suitable hook means 15 are operatively associated with the lure body 2 and are normally received completely within the confines or periphery of the elongate recess 4. These hook means 15, in this instance, are shown as a pair of hooks that have shank portions 16 thereon at the front ends thereof and with the hooks 17 being formed at the rear portions of the hook means as positioned in the lure body. Such hook means 15 are pivotally positioned in the lure body 2, as by a pin or shaft 18, that extends transversely of the lure body adjacent the front end of the elongate recess 4.

It should be noted that the coil spring 11 and the disc or washer 12 associated therewith engage the control pin so as to urge it forwardly into a normal position shown in FIG. 3 of the drawings. However, a slight compressive force exerted on the spring 11 through the front end of the control pin 6 can force it rearwardly in the lure body for latching action, as hereinafter described in more detail. This holds the hook means 15 in an inoperative position for normal action to pull or drag the lure body through a body of water for fishing action without catching numerous weeds thereon.

The actual latch means provided for the fish lure 1 comprise members that operatively engage between the hook means 15 and the latching lip 14 provided on the control pin to releasably latch the hook means 15 in inoperative position but with the latch means being releasable by a relatively slight restraining force applied to the fish lure body to permit the hook means to be snapped in arcuate movement outwardly of the lure body for exposing the hooks 17 so as to catch a fish who has struck at the fish lure of the invention. The latch means include a cross member, in this instance a substantially U-shaped member 19, the lower ends of which are secured, as by welding, to the shanks 16 of the hook means and with the U-member 19 normally extending substantially vertically or at a 90° angle to the shanks 16 but with the U-member 19 being of such height as to be received within the confines of the elongate recess 4 when the hook means are inoperatively positioned, as shown in FIG. 2. The U-member 19 thus provides a convenient device in association with the hook means for applying forces thereto to push them down into the elongate recess for latching action. The actual latching action, in this instance, is obtained by use of a cross bar 20 that is secured to and extends between the arms of the U-member 19 spaced between the top and bottom portions thereof. Such cross bar 20, as shown in FIG. 6, can then be moved downwardly into the elongate recess 4 so that the latching lip 14 of the control pin 6 can be pushed thereby to be positioned immediately axially to the rear of such cross bar 20, as in FIG. 2. In such position, application of a resilient force urging the hook means outwardly of the lure body will force the cross bar 20 against the control pin 6 with sufficient force as to retain the latch lip 14 and cross bar in an operative, latched engagement for quick release and a forcing or throwing of the hooks 17 outwardly of the lure body to catch or hook a fish striking the fish lure.

The resilient means urging the hook means 15 out of the lure body are shown as comprising a spring member 21 which includes a pair of coil spring sections 22 and 23 that have the pin 18 threaded therethrough for positioning the spring means operatively in the elongate recess 4. The spring member 21 also has a U-shaped center section 24 of suitable length. Such center section normally extends generally axially of the elongate recess 4 and is positioned below the shank portions 16 of the hook means for engaging the hook means and urging them to the position shown in FIG. 3. The ends 25 of the spring member 21 are suitably secured to the lure body 2. It will be seen that the U-shaped center section 24 of the spring member 21 can be forced downwardly in the elongate recess to a position shown in FIG. 2 when the hook means 15 are to be latched in their inoperative, or fishing position. At that time, the hooks are not exposed, and the fish lure 2 can be smoothly drawn through the water for a weedless type of fishing action and with the hooks 17 only being exposed when some restraining force has been exerted against continued movement of the lure body through the water, which action can be readily obtained by a fish striking at or biting on the fish lure body as it moves through the water. The force provided by the spring means 21 can be varied by changing the size and weight of the spring used to obtain a desired but not excessive throwing action in the hooks when released.

To aid in reenforcing the hook means 15, a cross bar 26 can be secured between the individual hook members and it can be received, for example, in a slot 27 formed in the lure body adjacent the end of the elongate recess 4.

A stop bar 28 is secured across the recess 4 to limit the outward movement of the hook means to only expose them for action.

While FIG. 2 shows what is thought to be the normal position of the fish lure as it moves through the water, it will be realized that the fish lure body can be designed so that the hook means 15 would spring out from the top of the fish lure, from the sides of the lure, or from the bottom of the lure, as desired. As previously indicated, the fish lure body may be of any desired size and configuration. The fish lure of the invention is believed to be relatively inexpensive and uncomplicated to produce but yet it will provide a very effective, weedless type of fishing action. The hooks can be retracted for safe storage and carrying of the lure. The line will release the hooks sharply when the fish lure is struck so that any fish striking or biting on the fish lure will be caught by the hooks as expelled from the elongate recess in the lure body.

It will be realized that the fish lures of the invention may be of any desired sizes and that the lures are shown in somewhat enlarged form for most uses, but that they can be of any suitable size and shape.

A lure indicated at 1a is shown in FIGS. 7 through 10, and this lure includes a lure body 2a. In general, the construction of this fish lure 1a is based on the same principles as the fish lure 1 but in this instance a pair of hooks are provided and are adapted to be moved in opposite directions when released. Thus a control pin, or rod is indicated at 6a and normally is received for only axial reciprocating movement in the fish lure body.

Such control pin 6a has a locking lip or tip 14a provided thereon and facing in the direction indicated as downward in the accompanying drawings. A positioning pin or shaft 18a extends transversely of the lure body in a longitudinally extending elongate recess or slot 4a provided in and extending through the fish lure body. Two separate hooks 30 and 31 are pivotally secured to the shaft 18a and each of these hooks has a member 32 or 33 of suitable shape secured thereto and extending therefrom in the direction of spring movement of the hooks, as hereinafter described. In this instance, the hook 30 has a member 32 formed thereon and with a cross bar 34 being provided thereon and extending across the center line of the fish lure body. Likewise, the member 33 extends downwardly from the fish hook 31 and has a cross bar 35 secured thereto and again extending across the longitudinal axis of the fish lure body. Thus, as in the other embodiment of the invention, the fish hooks 30 and 31 can be pushed inwardly of the fish lure to overlap each other in the inoperative positions, as shown in FIG. 8, and then the control pin 6a can be pushed rearwardly to engage the locking tip 14a underneath the cross bar 34. The cross bar 35 on the hook 31 will be urged towards the control pin by its associated spring means so that both hooks will be held in their inoperative or retracted positions. It will be realized that when the control pin 6a is pulled forwardly with relation to the cross bars, substantially simultaneously these hooks will spring out to their operative positions for fish catching action. Naturally these hooks can be positioned in the lure to be considered to move up and down with relation thereto, or to be sprung out from the sides thereof, as desired.

In order to obtain this action in the lure of the invention, it is necessary to provide two different springs 36 and 37 that are carried on the shaft 18a and have ends secured to the lure body 2a. Each of these springs 36 and 37 has an operative arm 38 and 39, respectively, secured thereto and engaged with one of the associated hook means 30 and 31, respectively, for the desired spring action to urge these hooks outwardly of the fish lure body.

Stop bars 40 and 41 extend across the recess 4a to limit pivotal movement of the hooks 30 and 31.

In view of the foregoing, it is believed that the objects of the invention have been achieved.

While two complete embodiments of the invention have been disclosed herein, it will be appreciated that modification of these particular embodiments of the invention may be resorted to without departing from the scope of the invention as defined in the appended claims.

What I claim is:

1. A weedless type fish lure comprising a lure body simulating a fish and having a tail and having a recess in its front section open to a margin thereof and an elongate recess in the body and tail thereof open to a margin of the lure body,
   a cover secured over said front section recess to provide a front compartment,
   a control pin extending from the front of said lure body to engage a fish line, and being of square shape in section, and slidably engaging said lure body and extending through said front compartment and into said elongate recess,
   a generally axially extending hook means having a front shank portion and a hook portion received within said elongate recess and normally positioned within the periphery of said lure body,
   means securing the shank end of said hook means pivotally to said lure body adjacent the front end of the shank,
   a coil spring positioned in said front compartment to engage said control pin and urge it forwardly of said lure body,
   spring means positioned in said elongate recess and engaging said hook means to urge said hook portion thereof outwardly of said lure body, and
   latch means operatively associated with said hook means and control pin to engage said control pin when moved rearwardly in the lure body and prevent said spring means from moving said hook means out of said elongate recess until said control pin is pulled forwardly to release said latch means as by a fish grabbing said lure body.

2. A weedless type fish lure comprising a lure body simulating a fish and having a front compartment and an elongate recess in the body thereof open to a margin of the lure body,
   a control pin extending from the front of said lure body to engage a fish line and slidably engaging said lure body and extending through said front compartment and into said elongate recess,
   a generally axially extending hook means having a front shank portion and a hook portion received within said elongate recess and normally positioned within the periphery of said lure body,
   means securing the shank end of said hook means pivotally to said lure body adjacent the front end of the shank,
   a spring positioned in said front compartment to engage said control pin and urge it forwardly of said lure body,
   spring means positioned in said elongate recess and engaging said hook means to urge said hook portion thereof outwardly of said lure body, and
   latch means operatively engaging said hook means and control pin, whereby said control pin when moved rearwardly in the lure body prevents said spring means from moving said hook means out of said elongate recess until said control pin is pulled forwardly to release said latch means as by a fish grabbing said lure body.

3. A weedless type fish lure comprising a lure body simultating a fish and having an elongate recess in the body thereof open to a margin of the lure body,
   a control pin extending from the front of said lure body to engage a fish line and be moved through a body of water thereby,
   said control pin slidably engaging said lure body and extending into said elongate recess,
   spring means in said lure body to engage said control pin and urge it axially forwardly,
   a generally axially extending hook means having a front shank portion and a hook portion received within said elongate recess and normally positioned within the periphery of said lure body,
   means securing the shank end of said hook means pivotally to said lure body adjacent the front end of the shank,
   spring means positioned in said elongate recess and engaging said hook means to urge said hook portion thereof outwardly of said lure body, and
   latch means operatively secured to said hook means to engage said control pin when moved rearwardly in the lure body and prevent said spring means from moving said hook means out of said elongate recess until said control pin is pulled forwardly to release said latch means by some restraining force applied to said lure body.

4. A weedless type fish lure comprising a lure body simulating a fish and having a compartment in its front section and an elongate recess in the body thereof open to a margin of the lure body,
   a control pin extending from the front of said lure body to engage a fish line and being of square shape in section slidably engaging said lure body and extending through said front compartment and into said elongate recess,
   a pair of hooks received within the margins of said elongate recess,
   means securing the shank ends of said hooks pivotally to said lure body adjacent the front ends of the shank,
a coil spring positioned in said compartment to engage said control pin and urge it forwardly of said lure body,
spring means positioned in said elongate recess and engaging said hooks to urge them outwardly of said lure body, and
a cross member secured to and extending between said hooks in the shank portions thereof and including a substantially straight bar section extending transversely of said lure body and offset from said hooks in a direction towards the opening in said recess,
said control pin having a small locking lip formed on the end thereof in said elongate recess and extending down towards the bottom of said recess,
said bar section of said cross member being engaged with said control pin and said locking lip by pushing said hooks into said elongate recess and by pushing said control pin inwardly of said lure body before release of said hooks whereby said bar section will engage said locking lip to prevent outward pivotal movement of said hooks until a restraining force is exerted on said lure body when it is being pulled through a body of water, which force will pull said locking lip over said bar section and release said hooks.

5. A weedless type fish lure comprising a lure body having an elongate recess in the body thereof open to a margin of the lure body,
a control pin extending from the front of said lure body to engage a fish line and be slidably engaged with said lure body and extending into said elongate recess,
a pair of hooks received within the margins of said elongate recess,
means securing the shank end of said hooks pivotally to said lure body adjacent the front end of the shank,
spring means positioned in said elongate recess and engaging said hooks to urge the hook portions thereof outwardly of said lure body, and
a cross member secured to and extending between said hooks in the shank portions thereof and including a section extending transversely of said lure body,
said control pin having a small locking lip formed on the end thereof in said elongate recess and directed towards the bottom of said recess,
said section of said cross member being engaged with said control pin and said locking lip by pushing said hooks inwardly of said elongate recess and by pushing said control pin inwardly of said lure body before release of said hooks whereby said section will engage said locking lip to prevent outward pivotal movement of said hooks until a restraining force is exerted on said lure body when it is being pulled through a body of water, which force will pull said locking lip over said section and release said hooks.

6. A weedless type fish lure comprising a lure body simulating a fish and having a recess in its front section and an elongate recess in the body thereof open to a margin of the lure body,
a control pin extending from the front of said lure body to engage a fish line and engaging said lure body for only axial movement therein,
said control pin extending through said front recess and into said elongate recess,
hook means with shank and hook portions received within the margins of said elongate recess,
means securing the shank end of said hook means pivotally to said lure body adjacent the front end of the shank,
a spring positioned in said front recess to engage said control pin and urge it forwardly of said lure body,
spring means positioned in said elongate recess and engaging said hook means to urge said hook portion thereof outwardly of said lure body, and
a cross member secured to and extending between said hook means in the shank portions thereof and spaced from the said securing means,
said control pin having a locking section formed on the portion thereof in said elongate recess and extending down towards the bottom of said recess,
said cross member being engaged with said control pin and said locking section by pushing said hook means inwardly of said elongate recess and by pushing said control pin inwardly of said lure body before release of said hook means whereby said cross member will engage said locking section to prevent outward pivotal movement of said hook means until a restraining force is exerted on said lure body when it is being pulled through a body of water, which force will pull said locking section over said cross member and release said hook means.

7. A fish lure as in claim 2 where said securing means for the shank end of said hook means is a pin member extending transversely of said elongate recess spaced from the bottom thereof, and said spring means comprises two coil spring sections, a center section of U-shape and end sections, said coil spring sections being carried by said pin member, said end sections being secured to said lure body, and said center section engaging said hook means in the said shank portion thereof to set up a continuous force thereof urging the said hook portions outwardly of said lure body.

8. A fish lure as in claim 2 where said control pin has a latching means formed thereon in the section thereof extending into said elongate recess and extending towards the base of said recess, and said latch means include an upstanding member secured to said hook means and including a cross bar, said upstanding member and said hook means being movable towards the base of said elongate recess against the action of said spring means to secure said cross bar under said control pin adjacent said latching means.

9. A lure as in claim 6 where a stop means is secured to said lure body, said stop means extending across said elongate recess spaced to the rear of said shank securing means and above said hook means to limit outward movement of said hook means.

10. A lure as in claim 6 where a stop bar extends across said elongate recess spaced to the rear of said shank securing means and above said hook means to limit outward movement of said hook means, said stop bar preventing movement of said hook means beyond an acute angle with the longitudinal axis of said lure body.

References Cited in the file of this patent

UNITED STATES PATENTS

| | | |
|---|---|---|
| 1,459,042 | Wrege | June 19, 1923 |
| 2,079,509 | Kettring | May 4, 1937 |
| 2,463,978 | Kunzelman | Mar. 8, 1949 |
| 2,896,355 | Dean et al. | July 28, 1959 |

FOREIGN PATENTS

| | | |
|---|---|---|
| 154,301 | Sweden | May 2, 1956 |